United States Patent [19]

Fukuda

[11] Patent Number: 4,804,536

[45] Date of Patent: * Feb. 14, 1989

[54] DIETARY FIBRES OF SEAWEED HAVING ION-EXCHANGE ABILITY

[75] Inventor: Keishi Fukuda, Mihara, Japan

[73] Assignee: Shimizu Kagaku Kabushiki Kaisha, Hiroshima, Japan

[*] Notice: The portion of the term of this patent subsequent to May 12, 2004 has been disclaimed.

[21] Appl. No.: 869,906

[22] Filed: Jun. 3, 1986

[30] Foreign Application Priority Data

Jun. 13, 1985 [JP] Japan ................................. 60-129028
Jan. 31, 1986 [JP] Japan ................................. 61-21055

[51] Int. Cl.$^4$ .............................................. A61K 35/78
[52] U.S. Cl. ............................ 424/195.1; 424/DIG. 6
[58] Field of Search ....................... 424/195.1, DIG. 6

[56] References Cited

U.S. PATENT DOCUMENTS 4,664,916 5/1987 Fukuda ............................. 424/195.1

OTHER PUBLICATIONS

Chem. Abst. 69:65391k, 1986.
Chem. Abst. 72:823g, 1978.
Chem. Abst. 84:40780v, 1976.
Chem. Abst. 103:10798a, 1985.
Chem. Abst., 75:73377n, 1971.
Chem. Abst., 93:192025b, 1980.

Primary Examiner—John W. Rollins
Attorney, Agent, or Firm—Wenderoth, Lind & Ponack

[57] ABSTRACT

Provided herein is a dietary food prepared mainly from brown algaes through treating them with acids for removing sodium ion which originally exists therein and neutralizing the thus obtained material with a solution containing an ion selected from the group of potassium, calcium, magnesium and iron to substitute any of the ions in the group for the removed sodium ion, and then making the resulting product into a solid form.

The thus obtained products exhibit a more favorable ion-exchange ability than natural seaweeds do and when they are taken into a living body, they act for decreasing or controlling the sodium content in the living body, consequently they can be used for the prevention of hypertension and cerebral apoplexy.

The thus obtained products can be used for a dietary food for health by themselves and together with other foods. They can also be formulated to a composition form such as tablets, granules and pulvers in combination with conventional vehicles adopted in the art.

10 Claims, 1 Drawing Sheet

DIETARY FIBRES OF SEAWEED HAVING ION-EXCHANGE ABILITY

BACKGROUND OF THE INVENTION (1) Field of the Invention

This invention provides a fiber product having an ion-exchange ability in a human and animal body. The process for preparing the product comprises exchanging a sodium ion naturally contained in some kind of seaweeds with an ion selected from the group consisting of potassium, calcium, magnesium and iron. The product of this invention is availed as a diet for decreasing the sodium content in a living body, consequently for depressing the blood pressure of the living body.

(2) Decription of the Prior Art

It is well known that an excess intake of a salt, that is sodium chloride, causes high blood pressure in human (hypertension) and some kinds of seaweeds, especially brown aglaes (Phaeophyceas) are known to have an effect for depressing blood pressure. This effect is said to be caused by alginic acid which exists in the seaweeds and when seaweed is taken in by a living body, alginic acid acts as an ion-exchange medium for absoring sodium ions in the body. The sodium ions are excreted from the body while releasing another kind of metal ions such as potassium.

Although this invention relates to improving this known effect for decreasing the salt content in a living body which effect seaweeds inherently possess, it has been identified that is not caused only by alginic acid but also caused by a complex and unclear mechanism including alginic acid. As will be illustrated in this specification, biological experiments carried out on the products of this invention showed different or superior results of those obtained by single administration of sodium alginate.

SUMMARY OF THE INVENTION

This invention relates to a novel dietary material in fiber form and a process of preparing the same which comprises possibly removing sodium from a raw material of brown algaes by treating with acids then neutralizing the thus obtained product with an aqueous solution containing an ion selected from the group consisting of potassium, calcium, magnesium and iron, and making the product into a solid and fiber form.

The thus obtained four kinds of a fiber material are confirmed to manifest as a dietary material an active and favorable activity in experiments employing rats.

An identification of each of four active fiber products of this invention is indicated together with some examples of dietary compositions containing as an active ingredient the active fiber products of this invention.

DETAILED DESCRIPTION OF THE INVENTION

Figure 1:
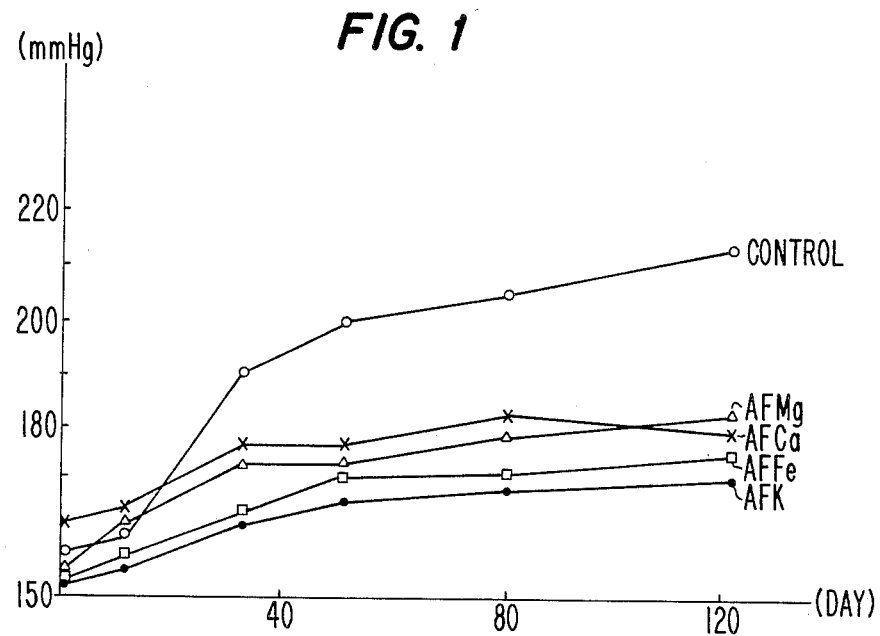

A raw material of this invention can be selected from seaweeds, especially brown algaes of the genuses such as Durvillea, Ascophyllum, Laminaria, Eisenia, Ecklonia, Lessonia, Macrocystis and so on.

In this invention, an acid employed for possibly removing sodium ions from the raw material is recommended to be an aqueous solution of hydrochloric acid or sulfric acid of less than pH 2. The quantity of the acid solution used is preferably 3 to 5 times of that of a raw material. Neutralization of the thus denatriumed solution is preferably carried out by adding about a 10% by weight aqueous solution of a water-soluble salt of each of potassium, calcium, magnesium and a ferric metal to raise the pH 6 to 7. The neutralized solution sometimes becomes vicous because the produced alginate, one of the components of the product of this invention, is solubilized out in the solution. In such a case, it is recommendable that more than 30% by weight alcohol be added to the neutralized solution to make the alginate deposit.

Isolation of the thus deposited material is conducted by proper means such as concentration to dryness, centrifugation, filtration and so on.

EXAMPLE

Example 1.: Preparation of the active fiber material containing potassium

Into 50 liters of 0.8N aqueous hydrochloric acid, 10 kg of powdered *Ascophyllum nodosum*, which is produced in the North Sea and has a water content of 10% by weight, were added. After stirring for 30 minutes then standing as it was for 30 minutes, the thus occurring supernatant solution was removed by a siphon then water was added to the remainder to make 50 liters in total. The solution was stirred and allowed to stand for 30 minutes. The same manner of stirring and standing were further repeated three times. Thereafter, the solution was adjusted to be 50 liters in total then a 10% by weight solution of potassium hydroxide was continually added to the adjusted solution under stirring until pH of the solution became about 7. To the solution 50 liters of an 80% by weight solution of ethanol were added under stirring. The thus produced solution was filtered by a filter cloth and the remaining material was centrifuged at a speed of 3,000 rpm for 10 minutes and was dried by hot air at 100C.° for a hour. The objective material of this invention was obtained in a fiber form.

In the product, the water content is less than 4% the potassium content is less than 600 ppm and the ratio of Na/K is less than 0.05.

Example 2.: Preparation of the acive fiber material containing calcium

To 100 kg of pulverized *Ascophyllum nodosum*, 400 liters of diluted hydrochloric acid were added under stirring and the the hydrochloric acid was removed by filtration. The remainder was washed with 200 liters of water three times. A suspension of 10 kg of calcium hydroxide in 200 liters of water was added slowly. The mixture was stirred then was adjusted to pH 6-7 and was filtered. The thus obtained filtrate was collected and dried at 60° C.

The thus obtained objective material is a brown powder and has a slight taste and odor like seaweeds. The content of ion-exchangeable calcium is identified to be about 5%.

Example 3.: Preparation of the active fiber material containing magnesium

In the same manner and quantities of materials as were employed in the foregoing Example 2 but using *Laminaria digitata* in place of *Ascophyllum nodosum* and using 12 of magnesium carbonate in place of 10 Kg of calcium hydroxide, the titled material was obtained.

The thus obtained objective material is a black powder and has a slight taste and odor like seaweeds. The content of ion-exchangeable magnesium is identified to be about 3%.

Example 4.: Preparation of the active fiber material containing iron

In the same manner and quantities of materials as were employed in the foregoing Example 2 but 40 Kg of ferric sulfate in place of 10 Kg of calcium hydroxide, the titled material was obtained.

The thus obtained objective material is a black powder and has a slight taste and odor like seaweeds. The content of ion-exchangeable iron is identified to be about 14%.

EFFECT OF THE INVENTION

The ion-exchange ability of the fiber material of this invention was investigated in vitro in comparison with that of alginic acid itself in the following manner.

Into each of nine sodium buffer-solutions of pH 1, 2,—9, the potassium product of the afore-mentioned Example 1 and potassium alginate were separately added and they were stirred vigorously. The removed test materials were washed with water and the sodium content was determined on each. The results showed that the critically increasing point of the exchanged quantity of sodium was at pH 7 with the former and at pH 8 with the latter.

Further, the IR absorption spectrum was compared with the potassium product of Example 1 and potassium alginate, an absorption at 1250 cm$^{-1}$ was found with the former but not with the latter and absorptions at 1300, 950 and 900 cm$^{-1}$ were found with the latter but not with the former.

From the above two results, it can be induced that an active ingredient of the produce of this invention is not identical with alginic acid itself not only in its purity but also in its chemical composition.

Biological activities of four kinds of a product of this invention will be illustrated following:

Experiment 1

Method

The groups, each consisting of 10 SHR (being caused by hypertension) rats were each respectively fed with a food which was separately admixed with 10% of the active fiber product of Example 1, Example 2, Example 3 and Example 4, hereinafter referred to, in turn, as 'AFK', AFCa', 'AFMg' and "AFFe'. Control by 10% of a quantity. Control groups of SHR rats were fed with a non-admixed food.

Figure 2:
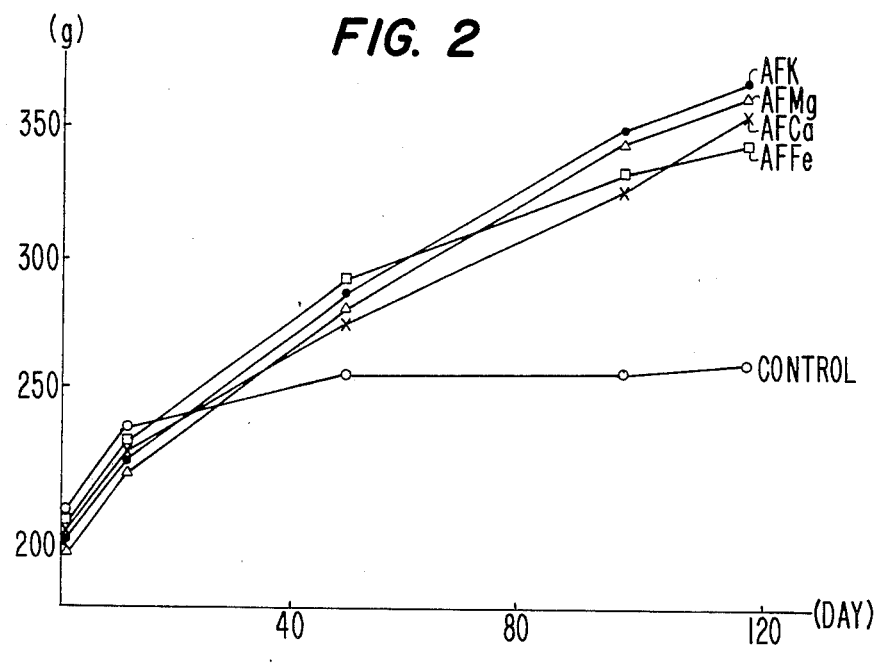

The experiment was continued for 120 days from the beginning and determination of the blood pressure and the body weight were carried out periodically with all of the rats. The results are illustrated in the accompanying drawings in which;

FIG. 1 is a chart showing the change of a blood pressure (mmHg) with an interval of 40 days, and FIG. 2 is a chart showing the change of body weight (g) with an interval of 40 days.

From the results thus obtained, it is identified that the active fiber products of this invention possess a definite and favorable effect for depressing the blood pressure and decreasing the body weight on animals.

Experiment 2

All of the test rats in Experiment 1 were moved into urine-collecting cages on the 100th day from the beginning of Experiment 1 and their urines were dividedly collected and the content of potassium, calcium and magnesium in the urines was separately determined and the Fe content was exceptionally determined in their blood.

The results are indicated in the following Table I;

TABLE I

| | AFK Group | AFCa Group | AFMg Group | AFFe Group | Control Group |
|---|---|---|---|---|---|
| Excretion of K (mg/day) | 21 + 1.4 | | | | 11.5 + 1 |
| Excretion of Ca (mg/day) | | 18 + 1 | | | 11 + 1.9 |
| Excretion of Mg (mg/day) | | | 16 + 2.9 | | 10 + 1.3 |
| Fe Content in Blood (mg/100 ml) | | | | 54 + 4.2 | 48 + 2.1 |

From the result indicated in Table I, the active fiber products of this invention are confirmed to possess a promoting effect for the excretion of sodium ion from a living body.

Further, as will be seen in a following Table II, of 9 SHR rats which were fed with AFK of this invention, 7 rats were saved from death caused by cerebral apoplexy whereas only 1 rat survived of 9 SHR rats in a control group.

To sum up the above, as the active fiber products of this invention are produced from a natural source, that is seaweed, they are fundamentally safe and harmless for a living body.

When the active fiber products of this invention will be taken by a human or an animal singly or together with other foods, the products act as a medium for ion-exchange and a sodium ion in the body is properly exchanged with another ion such as potassium, calcium, magnesium and ferric ions and is excreted out of the body together with the medium. At the same time, the therein released ions are absorbed through the digestive tract and are availed for a host. So, it is expected that the active fiber products of this invention will exhibit, as a health diet the effect of preventing hypertension and cerebral apoplexy on a human and an animal.

The active fiber products of this invention can be formulated for the purpose of providing health diets in combination with proper adjuvants and vehicles usually adopted in the art, for example;

Tablets; (Contents in 1 tablet)

| AFK (or AFCA, AFMG and AFFe) | 200 mg |
|---|---|
| Crystalline cellulose | 47 mg |
| Dextrin | 5 mg |
| Lactose | 20 mg |
| Caboxymethylcellulose | 5 mg |
| Talc | 3 m |

Granules; (Contents by %)

| AFK (or AFCa, AFMg and AFFe) | 67 |
|---|---|
| Crystalline cellulose | 7 |
| Gum arabic | 2 |
| Lactose | 24 |

The active fiber products of this invention can be availed as a health diet for a human and an animal by themselves and together with other foods.

What we claim is:

1. A dietary food product prepared from seaweeds by a process which comprises treating seaweeds with an acid for removing sodium ion therefrom, neutralizing the thus treated material to a pH of from 6 to 7 with a solution containing an ion selected from the group consisting of potassium, calcium, magnesium and iron, and forming the resultant product into a solid form.

2. A product in accordance with claim 1, wherein the seaweed is one from the genuses belonging to Phaeophyceas and which is selected from the group consisting of Durvillea, Ascophyllum Laminaria, Eisenia, Ecklonia, Lessonia and Macrocystis.

3. A product in accordance with claim 1, wherein the seaweed is selected from *Ascophyllum nodosum* and *Laminaria digitata*.

4. A product in accordance with claim 1, wherein the acid is selected from hydrochloric acid and sulfuric acid.

5. A product in accordance with claim 1, which is prepared employing as a neutralizer a solution containing potassium ion and said product contains a water content of less than 4% by weight, a potassium content of less than 600 ppm and a ratio of Na/K of less than 0.05.

6. A product in accordance with claim 1, which is prepared employing as a neutralizer a solution containing calcium ion and said product contains about 5% by weight of ion-exchangeable calcium.

7. A product in accordance with claim 1, which is prepared employing as a neutralizer a solution containing magnesium ion and said product contains about 3% by weight of ion-exchangable magnesium.

8. A product in accordance with claim 1, which is prepared employing as a neutralizer a solution containing ferric ion and said product contains about 14% by weight of ion-exchangeable iron.

9. A dietary food composition containing as an active component more than 50% by weight of a product as claimed in claim 1 together with conventionally adopted adjuvants and vehicles in the art.

10. A composition in accordance with claim 9 in the form of tablets or granules.

* * * * *